Figure 1:
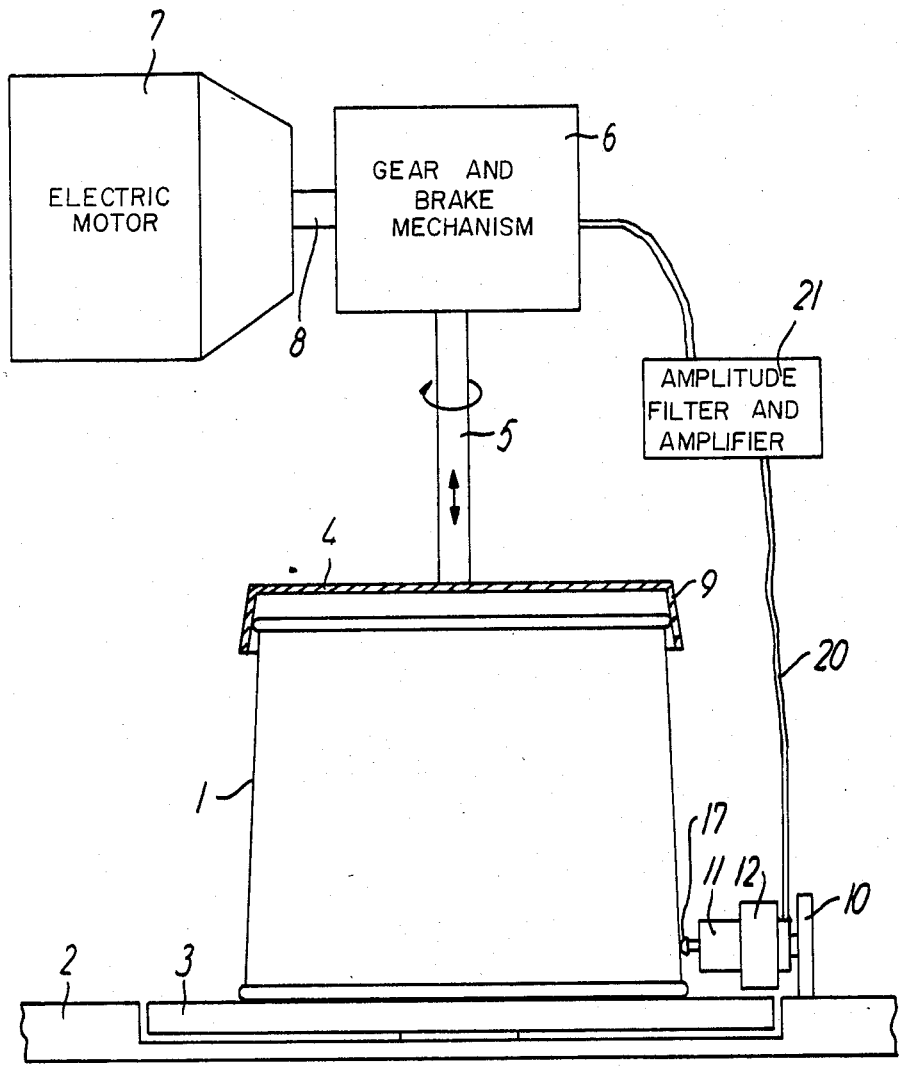

United States Patent [19]

Peronard

[11] Patent Number: 4,494,070
[45] Date of Patent: Jan. 15, 1985

[54] APPARATUS FOR POSITIONING RECEPTACLES OF FERROMAGNETIC MATERIAL AND HAVING A WELDING SEAM

[75] Inventor: Pierre-René Peronard, Virum, Denmark

[73] Assignee: Dansk Svejsemaskine Fabrik A/S, Denmark

[21] Appl. No.: 337,949

[22] Filed: Jan. 7, 1982

[30] Foreign Application Priority Data

Jan. 20, 1981 [DK] Denmark ............................ 249/81

[51] Int. Cl.³ .............................................. G01B 7/14
[52] U.S. Cl. .................................... 324/208; 340/687
[58] Field of Search ............... 324/207, 208, 219–221, 324/226, 228, 239; 340/686, 687

[56] References Cited

U.S. PATENT DOCUMENTS

| | | | |
|---|---|---|---|
| 3,141,952 | 7/1964 | Preston | 214/125 |
| 3,233,231 | 2/1966 | Anderson | 340/686 X |
| 3,305,711 | 2/1967 | Quittner | 324/208 |
| 3,430,134 | 2/1968 | Flaherty et al. | 324/243 |
| 3,827,296 | 6/1974 | Hidaka | 73/160 |
| 3,921,065 | 11/1975 | Rawlins et al. | 324/238 |
| 4,384,252 | 5/1983 | Kolter | 324/239 |

FOREIGN PATENT DOCUMENTS 2928899 1/1980 Fed. Rep. of Germany .

Primary Examiner—Gerard R. Strecker
Assistant Examiner—Walter E. Snow
Attorney, Agent, or Firm—Bacon & Thomas

[57] ABSTRACT

When receptacles (1) having a substantially cylindrical side wall and a welding seam extending in the direction of the axis are to be angulary positioned it is known to rotate the receptacle about the axis and detect the passage of the welding seam past a probe and thereafter stop the receptacle a predetermined number of degrees after the detection. Provided that the receptacle wall is of a ferromagnetic material and that there is a substantial material overlapping at the welding seam the detection can take place by means of a magnetic probe for measuring the material thickness. However this method can not be used if there is only a slide material overlapping at the welding seam. In this case the use of a magnetic probe (11) urged against the receptacle wall (1) by spring means is suggested. The effect is based on the fact that the tip (17) of the probe on passage of the welding seam loses contact with the receptacle wall whereby a comparatively great pulse is produced in the output signal of the probe, said pulse being used as an energizising signal for stopping means (6) for the receptacle (1).

1 Claim, 3 Drawing Figures

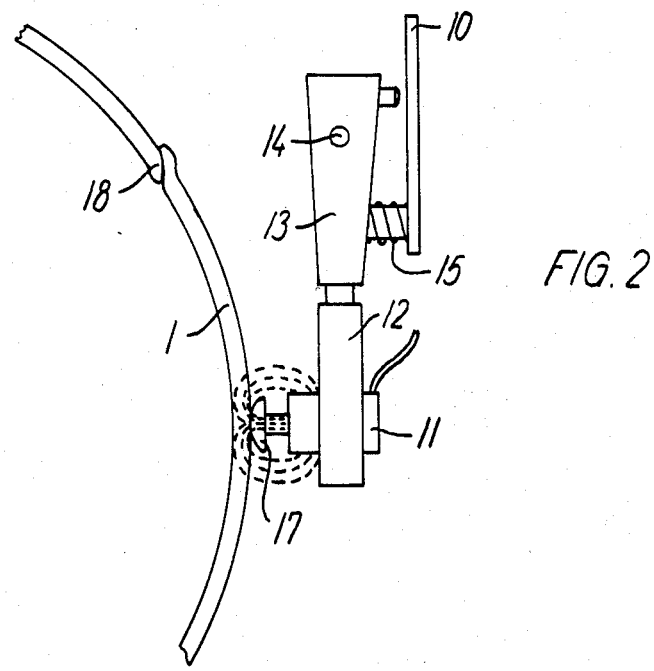
FIG. 2
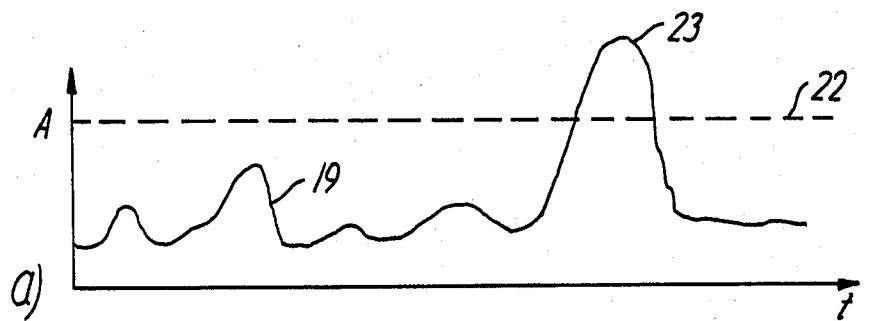
FIG. 3
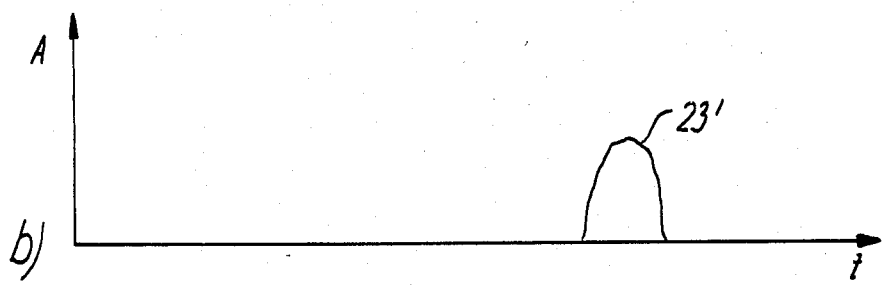

APPARATUS FOR POSITIONING RECEPTACLES OF FERROMAGNETIC MATERIAL AND HAVING A WELDING SEAM

The invention relates to an apparatus for positioning receptacles having a substantially cylindrical side wall of ferromagnetic material and a longitudinal welding seam, comprising means for rotating the receptacle about the cylinder axis, detecting means for detecting the welding seam and including a magnetic probe having a tip of ferromagnetic material projecting from a housing and being adapted to produce a magnetic field through the receptacle wall and having means for determining the strength of the field, and means for stopping the rotational movement a predetermined number of degrees, including 0 degrees, after the detection.

It is known to detect the thickness of ferromagnetic material by means of a magnetic field which is sent through the material from a probe. The probe comprises an electric winding inserted in an electric circuit arrangement in which the winding may for instance constitute a frequency-determining part of an oscillatory circuit. The circuit arrangement may for instance be adapted in such a way that the oscillatory circuit is at resonance when in the magnetic field of the probe a single layer of ferromagnetic material of a predescribed thickness is present. If the material is removed from the magnetic circuit of the probe, or if two or more material layers are inserted, the oscillation amplitude will be reduced, or the oscillations will cease completely.

For positioning of welded steel tubes it is furthermore known, as shown in U.S. Pat. No. 3,972,432, to use a probe having two adjacent windings, each one provided with a ferromagnetic core. The probe is maintained at a certain distance from the tube wall. The windings are included in an alternating current bridge, the equilibrium of which is disturbed when the probe passes the welding seam because of the variation of the material thickness.

Such known devices can normally also be used to detect the welding seam in the above-mentioned receptacles, because at the place of the seam there is considerable overlapping of the welded edges.

However, during recent years a new welding method, the so called "Opprecht-method", disclosed in U.S. Pat. No. 4,160,892, has appeared by which a welding seam is produced having a comparatively slight material overlapping and a thickness which is considerably smaller than twice the material thickness of the side wall. Such a welding seam cannot be detected with certainty by means of the devices described above which require a substantial overlapping and a considerable variation of the material thickness, for instance to twice the value.

It is the object of the present invention to provide an apparatus which can detect with certainty welding seams produced by the "Opprecht-method". According to the invention this is obtained by means of spring members for pressing the tip of the probe elastically against the cylindrical receptacle wall and by an adaption of the detecting means in such a way that by a sudden variation of the magnetic field through the receptacle wall an activating signal for the stopping means is produced. The apparatus according to the invention is based on another principle than said known devices. The invention is based on the recognition that when the tip of the probe, which is urged against the receptacle wall by spring power, passes the welding seam an air gap will for a short moment be produced between the tip and the receptacle wall, since the tip cannot, because of the inertia of the probe, follow the wall when the probe has been pushed back by the rise formed by the welding seam. Therefore, a great electrical pulse will be produced in the winding of the probe. In this case it is not the material thickness which is measured.

In addition to the advantage indicated above, namely the reliable detecting of the welding seam, the further advantage is obtained by the invention that the electrical circuit arrangement can be extremely simple, because it only has to give the pulse produced in the winding of the probe such a magnitude and shape that it can be used as an energizing signal for the stopping means.

The detecting means can be especially simple if the probe contains a permanent magnet, since according to the invention in that case the detecting means need only contain the electrical amplifier and an amplitude-filter. There is no need for a current supply to the probe. The permanent magnet produces a permanent magnetic field through part of the receptacle wall and by any variation in this magnetic field an electrical output signal will come from the probe. During rotation of the receptacle a variation of the magnetic transitional resistance between the tip of the probe and the receptacle wall will constantly occur and a certain output signal from the probe will therefore always be present. In the moment when the tip of the probe has just passed the welding seam, and therefore temporarily out of contact with the receptacle wall, a significantly greater variation of the magnetic resistance occurs and this manifests itself in a probe output signal which has a significantly greater amplitude than the other output signals. By means of a simple amplitude filter the high signal occuring on passage of the welding seam can be separated from the remaining signals and after amplification it can be used as a control signal for the stopping means.

In the following the invention will be explained in detail with reference to the schematic drawing in which:

FIG. 1 shows an apparatus according to the invention for positioning cylindrical receptacles, FIG. 2 in an enlarged scale the probe shown in FIG. 1 in contact with part of the receptacle wall and FIG. 3 two curves for explaining the working of the apparatus.

The apparatus shown in FIG. 1 for positioning receptacles 1, such as tinboxes and pails, of ferromagnetic material comprises an apparatus base 2 in which a turntable 3 is journaled for free rotation about a vertical axis.

Above the turntable and with the same axis of rotation as turntable 3 is mounted a driving disc 4 arranged on a shaft 5 which, via a gear and brake mechanism 6, can be driven from an electric motor 7 connected to the gear and brake mechanism via a shaft 8. The shaft 5 and the driving disc 4 can furthermore be raised and lowered.

The driving disc 4 has an edge 9 for gripping the bottom of the receptacle and thereby rotating same.

In a part 10 of the apparatus frame which is in firm connection with the basis 2 a magnetic probe 11 is journaled. This probe is firmly arranged in a carrier 12 which is rigidly connected to a member 13, as shown in FIG. 2, which can rotate on a shaft 14 and which is biased by a pressure spring 15. As a result of this construction the tip 17 of the probe is constantly urged against the substantially cylindrical sidewall of the receptacle 1. The probe contains a permanent magnet producing a magnetic field through the ferromagnetic tip 17 and part of the receptacle wall, cf. FIG. 2.

When the apparatus is in operation receptacles 1 are supplied to the turntable 3 by means of some sort of conveyor mechanism, e.g. conveyer band. When one of the receptacles is placed on the turntable the shaft 5 and the driving disc 4 are lowered towards the receptacle whereby the driving edge 9 engages the up-turned bottom edge of the receptacle. Thereafter the shaft 5 is coupled to the driving motor 7 via the gear and brake mechanism 6 so that the driving disc 4 rotates the receptacle 1 and the turntable 3. During this rotation a magnetic field is constantly propagating from the tip 17 of the probe through the receptacle wall 1 and back to the housing of the probe, as shown in FIG. 2. The probe comprises a permanent magnet for producing the said magnetic field together with a coil encircling the magnetic flux whereby an electric voltage is induced in the coil by each variation of the magnetic field. The magnetic field varies when the magnetic resistance between the tip of the probe and the wall of the receptacle varies which will constantly take place during the rotation of receptacle, i.a. because of irregularities in the surface of the receptacle. When the tip 17 of the probe passes the welding seam 18, representing a certain rise, the whole probe 11 will be urged back against the influence of the spring 15.

If the rotation of the receptacle takes place at a certain speed the tip 17 of the probe cannot, because of the inertia of the probe, exactly follow the surface of the receptacle immediately after the welding seam and an air gap between the tip 17 of the probe and the wall of the receptacle will therefore be formed for a short time. This causes a variation of the magnetic field which is substantially greater than the variations produced because of random irregularities in the wall of the receptacle and an electric pulse is therefore produced which is substantially greater than the remaining electric signals from the probe.

This is illustrated in FIG. 3a where the curve 19 shows the amplitude A of the electrical signal as function of time t. The electrical signal is supplied from the probe 11 via a conductor 20 to an electric circuit arrangement 21 comprising an amplitude filter and an amplifier. If the amplitude filter for example has a threshold value represented by the dotted line 22 in FIG. 3a only the pulse 23 produced on passage of the welding seam will pass the amplitude filter. After passage of the amplitude filter the signal will therefore contain only a pulse 23', as shown in FIG. 3b, representing the passage of the welding seam. The amplification of the signal can take place either before or after the amplitude filter or both before and after.

By means of the pulse 23' or and electrical signal derived therefrom a decoupling of the shaft 5 from the driving motor 7 and a braking of the shaft 5 and thereby the driving disc 4 and the receptacle 1 is produced in the gear and brake mechanism 6. These operations can be initiated at the moment when the pulse 23' occurs. However, a certain time delay may be introduced so that the stopping does not take place until after a predetermined, possibly adjustable, time after detection. Under the assumption that the receptacle rotates at a constant speed, it is thereby possible to cause the receptacle to stop upon having rotated a predetermined number of degrees after the probe has past the welding seam.

The invention is not limited to the embodiment shown on the drawing and described above but can be modified in different ways within the scope of the following claims.

I claim:

1. An apparatus for positioning receptacles having a substantially cylindrical side wall of ferromagnetic material and a longitudinal welding seam in a predetermined angular position, which apparatus comprises:
    (a) means for rotating the receptacle about the cylinder axis thereof;
    (b) first means for detecting the welding seam, the first means including a magnetic probe having a tip of ferromagnetic material, a housing, the tip of the probe projecting from the housing, and a permanent magnet disposed in the housing for producing a magnetic field extending outside the probe between the tip and the housing;
    (c) means for mounting the probe, the mounting means including spring means for elastically urging the probe towards the cylindrical receptacle wall so as to bring the tip into engagement therewith and for movement in a direction towards and away from the cylindrical wall of the receptacle, and permitting ejection of the probe outwardly from the wall when the tip engages the welding seam to create an air gap of sufficient duration for producing a variation in the strength in the field exceeding a predetermined threshold value;
    (d) second means for detecting the variation in the strength of the field created by ejection of the probe; and
    (e) means for stopping the rotational movement of the receptacle a predetermined number of degrees, including zero degrees, after the detection of the variation in the strength of the field created by ejection of the probe.

* * * * *